(12) United States Patent
Inman

(10) Patent No.: US 6,890,495 B1
(45) Date of Patent: May 10, 2005

(54) PLASMA-ASSISTED PROCESSING OF GASEOUS MEDIA

(75) Inventor: Michael Inman, Abingdon (GB)

(73) Assignee: Accentus PLC, Didcot (GB)

( * ) Notice: Subject to any disclaimer, the term of this patent is extended or adjusted under 35 U.S.C. 154(b) by 0 days.

(21) Appl. No.: 09/890,157

(22) PCT Filed: Feb. 28, 2000

(86) PCT No.: PCT/GB00/00714

§ 371 (c)(1),
(2), (4) Date: Jul. 27, 2001

(87) PCT Pub. No.: WO00/51714

PCT Pub. Date: Sep. 8, 2000

(30) Foreign Application Priority Data

Mar. 2, 1999 (GB) .............................. 9904640

(51) Int. Cl.⁷ ................................. B01J 19/08
(52) U.S. Cl. .................... 422/186.04; 60/275
(58) Field of Search .................. 422/186.04; 60/275

(56) References Cited

U.S. PATENT DOCUMENTS

| | | | | | |
|---|---|---|---|---|---|
| 822,981 | A | * | 6/1906 | Paterson | ....................... 223/91 |
| 4,954,320 | A | * | 9/1990 | Birmingham et al. | .. 422/186.04 |
| 5,746,051 | A | | 5/1998 | Kieser | .......................... 60/275 |
| 5,822,981 | A | * | 10/1998 | Williamson et al. | ........... 60/275 |

FOREIGN PATENT DOCUMENTS

| | | | | |
|---|---|---|---|---|
| EP | 0 366 876 A | * | 5/1990 | |
| JP | 04 027 414 A | * | 5/1992 | |
| WO | WO 99 43 419 A | * | 2/1999 | |

* cited by examiner

*Primary Examiner*—Kishor Mayekar
(74) *Attorney, Agent, or Firm*—William H. Holt

(57) ABSTRACT

A reactor for the plasma-assisted processing of a gaseous medium, including a pair of electrodes having facing surfaces the separation of which is substantially uniform, with a body of dielectric material positioned between them and defining a plurality of gas passages extending through the space between the electrodes.

19 Claims, 1 Drawing Sheet

PLASMA-ASSISTED PROCESSING OF GASEOUS MEDIA

BACKGROUND OF THE INVENTION

1. Field of the Invention

The present invention relates to the plasma-assisted processing of gaseous media and in particular to the reduction of the emissions of one or more of nitrogenous oxides, particulate including carbonaceous particulate, hydrocarbons including polyaromatic hydrocarbons, carbon monoxide and other regulated or unregulated combustion products from the exhausts of internal combustion engines.

2. Description of the Related Art

One of the major problems associated with the development and use of internal combustion engines is the noxious exhaust emissions from such engines. Two of the most deleterious materials, particularly in the case of diesel engines, are particulate matter (primarily carbon) and oxides of Nitrogen ($NO_x$). Increasingly severe emission control regulations are forcing internal combustion engine and vehicle manufacturers to find more efficient ways of removing these materials in particular from internal combustion engine exhaust emissions. Unfortunately, in practice, it is found that combustion modification techniques which improve the situation in relation to one of the above components of internal combustion engine exhaust emissions tend to worsen the situation in relation to the other. A variety of systems for trapping particulate emissions from internal combustion engine exhausts have been investigated, particularly in relation to making such particulate emission traps capable of being regenerated when they have become saturated with particulate material.

Examples of such diesel exhaust particulate filters are to be found in European patent application EP 0 010 384; U.S. Pat. Nos. 4,505,107; 4,485,622; 4,427,418; and 4,276,066; EP 0 244 061; EP 0 112 634 and EP 0 132 166.

In all the above cases, the particulate matter is removed from diesel exhaust gases by a simple physical trapping of particulate matter in the interstices of a porous, usually ceramic, filter body, which is then regenerated by heating the filter body to a temperature at which the trapped diesel exhaust particulates are burnt off. In most cases the filter body is monolithic, although EP 0 010 384 does mention the use of ceramic beads, wire meshes or metal screens as well. U.S. Pat. No. 4,427,418 discloses the use of ceramic coated wire or ceramic fibres.

In a broader context, the precipitation of charged, particulate matter by electrostatic forces also is known. However, in this case, precipitation normally takes place upon large planar electrodes of metal screens.

GB patent 2,274,412 discloses a method and apparatus for removing particulate and other pollutants from internal combustion engine exhaust gases, in which the exhaust gases are passed through a bed of charged pellets of material, preferably ferroelectric, having high dielectric constant. In addition to removing particulates by oxidation, especially electric discharge assisted oxidation, there is disclosed the reduction of $NO_x$ gases to nitrogen, by the use of pellets adapted to catalyse the $NO_x$ reduction.

Also, U.S. Pat. Nos. 3,983,021, 5,147,516 and 5,284,556 disclose the catalytic reduction of nitrogen oxides. However, U.S. Pat. No. 3,983,021 is solely concerned with the reduction of NO to N in a silent glow discharge, the temperature of which is kept below a value at which the oxidation of N or NO to higher oxides of nitrogen does not occur. There is no mention of any simultaneous removal of hydrocarbons.

U.S. Pat. No. 5,284,556 discloses the removal of hydrocarbons from internal combustion engine exhaust emissions. The process involved is one of dissociation in an electrical discharge of the so-called 'silent' type, that is to say, a discharge which occurs between two electrodes at least one of which is insulated. The device described is an open discharge chamber. Mention is made of the possible deposition of a $NO_x$-reducing catalyst on one of the electrodes.

A conventional dielectric barrier plasma assisted gas reactor such as that disclosed in specification U.S. Pat. No. 5,284,556, consists of a plasma volume situated between two electrodes at least one of which has a dielectric barrier in the form of a thick layer of an insulating medium on its inner surface. JP-A-4027414 also discloses a dielectric barrier type of reactor in which electrodes, arranged parallel to the direction of gas flow, are positioned on opposite sides of a dielectric material through which bored holes provide gas passages.

In order to generate a plasma in such a device, the potential within the space between the electrodes must reach a critical value before the plasma will ignite. The potential which appears across the main plasma volume is dependent upon the ratio of the capacitance of the dielectric layer and that of the plasma volume because these two entities create a capacitive potential divider. The potential across the plasma volume is inversely proportioned to its capacitance, that is to say, the higher the capacitance of the plasma volume, the lower is the potential difference across it. This effect can cause a serious problem if the plasma volume is filled with a gas permeable material which has a high dielectric constant, such as pellets of barium titanate, because the potential difference across such a reactor bed may never reach the critical value for the plasma to ignite unless the supply voltage is very high, of the order of tens of kilovolts which may exceed the safe working voltage of the dielectric barrier, or other high voltage components of the power supply.

SUMMARY OF THE INVENTION

It is an object of the present invention to provide an improved reactor for the plasma-assisted processing of a gaseous medium.

According to the invention there is provided a reactor for the plasma assisted processing of a gaseous medium, the reactor including a pair of electrodes having facing surfaces and spaced from each other for providing a separation therebetween, the separation of the facing surfaces being substantially uniform and defining a space between the pair of electrodes, a body of dielectric material positioned for providing a dielectric barrier between the pair of electrodes (1,2;21,22) and configured for dividing the space between the pair of electrodes (1,2;21,22) into a plurality of gas passages (6;24), the gas passages providing the plasma volume for the reactor, the gas passages having lengths along which gas flows duing use of the reactor, the gas passages (6;24) being aligned so that the lengths extend between and in a direction parallel with the facing surfaces of the pair of electrodes (1,2;21,22), the gas passages being spaced apart from one another in a direction perpendicular to the facing surfaces, the gas passages (6;24) including a pair of opposed sides having a contour which matches the contour of the facing surfaces of the pair of electrodes (1,2;21,22), the shape and spacing of the gas passages providing for a substantially uniform distribution of electric field across the plasma volume between the pair of electrodes, the pair of electrodes are embedded in the body of dielectric material which extends across the space between the pair of electrodes, the plurality of gas passages extending longitudinally of the body of dielectric material to provide the plurality of electrically equivalent plasma volumes extending in series across the space between the pair of electrodes.

Preferably the matrix of gas passages in the dielectric medium between the electrodes is adapted to provide a potential difference across the plasma volume space between the electrodes equal to half the supply voltage. The potential difference across this space will vary according to gas flow, temperature and gas composition and therefore the overall size and shape and position of location of the reactor within the exhaust system is selected so as to ensure that variances from this optimum condition are minimized.

The surfaces of the gas passages can be coated, impregnated or generally treated by for example ion exchange or doping with a material which is catalytically active in relation to the gas and or particulate processing reactions to be carried out in the reactor, or the gas passages can be filled with a gas permeable form of such a material. The geometry of the gas passages or the gas permeable filling material, which may be dielectric, can then be adapted to negate the capacitive effects of the catalytic material. Alternatively, the dielectric material of the reactor can itself be chosen to be catalytic in relation to the gas and or particulate processing reactions to be carried out in the reactor. The gas permeable material filling the passages can be catalytically-active or non-catalytically thermally-active with respect to processing of the gaseous medium although a catalytically-active material may be present on the surface of non-catalytic dielectric material contained in the reactor as a coating or it may be present on or in the gas permeable filling material by generally treating the material by for examples on exchange or doping.

Gas permeable dielectric filling material for the reactor can be in the form of spheres, pellets, extrudates, fibres, sheets, wafers, frits, meshes, coils, foams, membrane, ceramic honeycomb monolith or granules or as a coating on any of the above shapes or on a ceramic foam or ceramic honeycomb monolith. In addition to optimising the plasma discharge and gas processing characteristics, combinations of one or more of the above can be used to create a filter structure with a non-uniform surface area and porosity, for example a graded porosity when presented to the exhaust gas particularly when containing particulates as described in patent specification WO00/43102. Gas permeable dielectric filling material that can be placed inside the reactor can also be housed outside of the plasma region of the reactor so that the gaseous media can either pass through this material before entering the plasma region or pass through this material after passing through the plasma region. When placed outside the reactor, dielectric filling material can be replaced by ceramic, polymeric or metallic material in the same form described above for the dielectric filling material. Dielectric filling material can act as a selective filter as described in the specification of our PCT/GB00/3943 Dielectric material or trapped species on it in the plasma can be made to appear to act as a catalytic surface to the gas processing reactions even though neither the plasma nor the dielectric material nor trapped species alone need have catalytic properties as described in the specification of our application PCT/GB00/3943.

When the gaseous medium comprises the exhaust gases containing nitrogenous oxides and particulate material such as carbonaceous particulate that are derived from an internal combustion engine supplied with combustion fuel, the exhaust gases can contain hydrocarbon either added separately or residually derived from the fuel combustion. The exhaust can contain a chemical additive acting as a carbon combustion catalyst that is either present initially in the fuel or added separately to the exhaust and whose function is to lower the combustion temperature and/or increase the rate of removal of carbonaceous material. Carbon combustion catalyst can be encapsulated within or bound to a fugitive additive that chemically decomposes during or shortly after fuel combustion thus releasing the additive into the fuel or exhaust. Examples of carbon combustion catalysts are alkali metal salts such as lithium nitrate described in GB 2 232 613 B, cerium oxide, alkali-metal doped lanthanum oxide-vanadium oxide, perovskites such as $La_{0.9}K_{0.1}CoO_3$ and also layered perovskites or vanadate or combinations of such materials although such carbon combustion catalysts can also constitute all or part of the dielectric filling material described above. The mode of operation of such catalysts is described in our specification WO00/43102. The use of a carbon combustion catalyst can reduce the power requirements to the plasma reactor for treating carbonaceous particulate material and reduce the volume of active material.

For the reduction of nitrogenous material for which zeolites are particularly useful materials, the plasma can produce activated hydrocarbon from hydrocarbon reductant in the exhaust as described in our publication WO99/12638 and/or convert nitrogenous oxides to nitrogen dioxide as described in WO99/12638 and WO00/43102. It should be appreciated that material that is not catalytic for the reduction of nitrogenous material when not exposed to a plasma may develop catalytic properties for this reduction when exposed to a plasma due for example to activation by O atoms or other plasma-generated free radicals or activation by plasma generated species such as activated hydrocarbons and or nitrogen dioxide. It should be appreciated that the dielectric filling material can also be placed outside the plasma zone and outside the reactor with a multiplicity of additive injection ports as described in WO99/12638. Catalytic properties can be further augmented by the electric field and or other charged species present in or adjacent to the plasma region. A reductant other than hydrocarbon may be used, in particular nitrogen containing species such as ammonia, urea or cyanuric acid. When a nitrogen containing species is used as a reductant for nitrogeneous oxide reduction a particularly useful catalyst is vanadium pentoxide-titanium dioxide. When using a nitrogen containing reductant species, mixing with effluent can also be made after the effluent has passed through the plasma zone of the reactor before contact with the catalyst.

BRIEF DESCRIPTION OF THE DRAWINGS

The invention will now be described, by way of example, with reference to the accompanying drawings, in which

Referring to FIG. 1 of the drawings, the operative part of a reactor for the plasma assisted processing of a gaseous medium includes two planar electrodes 1 and 2 to one of which is connected a high voltage supply cable 3. The other electrode has a cable 4 connected to it by means of which it can be connected to a suitable grounding point. The electrodes 1 and 2 are surrounded and separated by a body 5 of a dielectric material, which supports the electrodes so that there is a substantially uniform separation of their facing surfaces. The dielectric material is required to maintain thermal stability across a range of exhaust gas temperatures, and is selected from such materials as alpha and gamma aluminas, aluminosilicate ceramics, cordierite, silicon carbide, mullite or a moldable dielectric ceramic material such as the micaceous glass MICATHERM as disclosed in our patent specification WO99/20373. A number of identical gas passages 6 extend through the body 5 of dielectric material parallel to the electrodes 1 and 2 and spaced apart from one another in a direction transverse to the said facing surfaces so that a uniform distribution of electric field occurs across the space between the electrodes.

The gas passages 6 are separated by regions 7 of dielectric medium which are of equal thickness and parallel to the electrodes 1 and 2 so as to form a distributed dielectric barrier between the electrodes 1 and 2.

The electrical isolation of the gas passages 6 from one another prevents the plasma from forming a short circuit between the electrodes 1 and 2. Also, it can be shown that the maximum coupling of power into the plasma volume between the electrodes 1 and 2 occurs when the potential drop across the plasma volume is equal to half the supply voltage. This can be achieved by a suitable choice of the number and cross-section of the gas channels 6. The supply voltage can be derived from a resonant power supply that is adjacent thus in close proximity to the reactor as described in our publications WO99/05400 and the specification of our application WO00/43645.

If desired, the gas channels 6 can be filled with a gas permeable body made of an insulating material which is catalytic or non-catalytic towards the gas and or particulate processing reactions to be carried out in the reactor. Alternatively, the surfaces of the gas passages 6 or gas permeable filling material can be coated with such a catalytic material, or the entire body of dielectric can be made of such a material. The choice of material, which can by itself be catalytic or non-catalytic in the presence or absence of the plasma, depends on the requirements to process nitrogeneous oxides or particulate material and other emissions described previously. Dielectric material or trapped species on it in the plasma can be made to appear to act as a catalytic surface to the gas processing reactions even though neither the plasma nor the dielectric material nor trapped species alone need have catalytic properties. Gas permeable dielectric filling material that can be placed inside the reactor can also be housed outside of the plasma region of the reactor so that the gaseous media can either pass through this material before entering the plasma region or passes through this material after passing through the plasma region. It will be appreciated that the same material can be used in the plasma zone as outside the plasma zone or combinations of different materials can be used in the plasma zone and outside the plasma zone and that exhaust gas and or particulate processing reactions can be carried out by combinations of identical or different materials in or out of the plasma zone.

In practice, of course, the operative part of the reactor is contained in an envelope which includes inlet and outlet stubs by means of which it can be incorporated in pipework through which the gaseous medium to be processed is caused to flow and means for ensuring that all the said gaseous medium passes through the gas passages 6.

Figure 1:
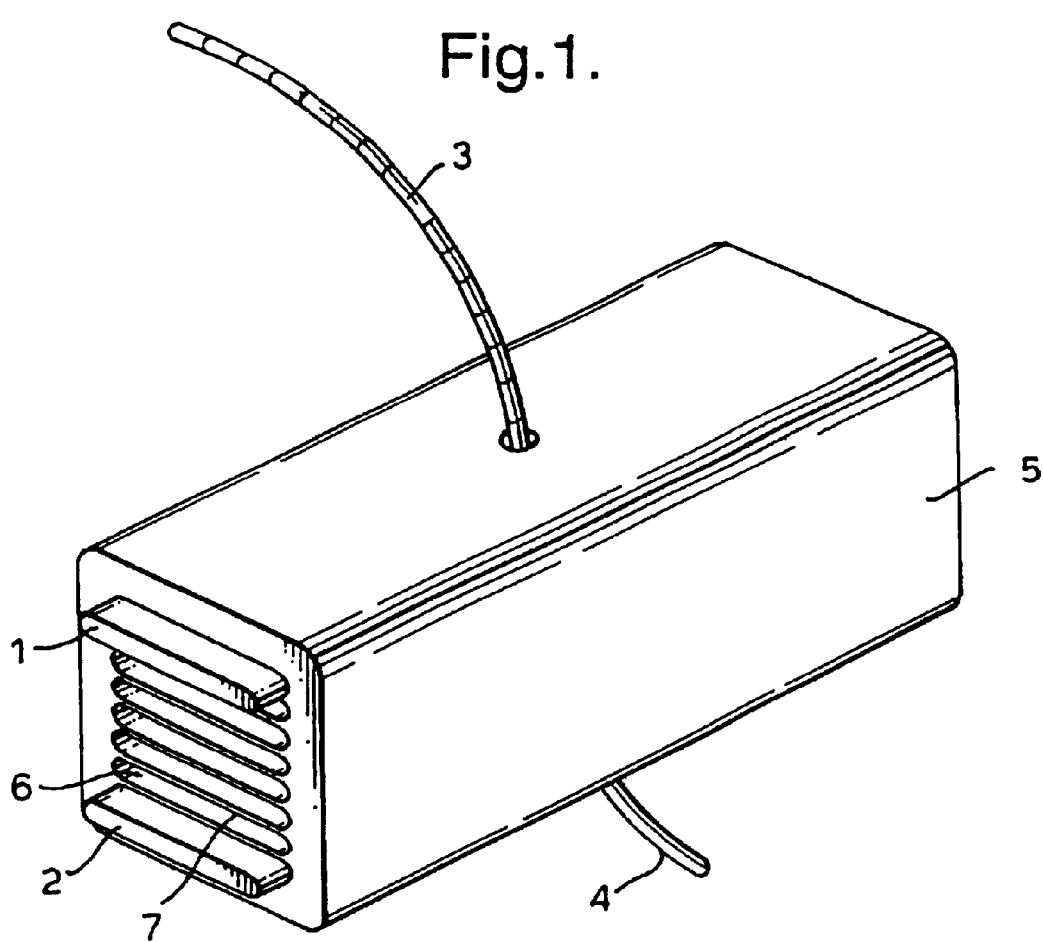
FIG. 1 is a perspective view of the operative part of a reactor embodying the invention for the plasma assisted processing of a gaseous medium.
Figure 2:
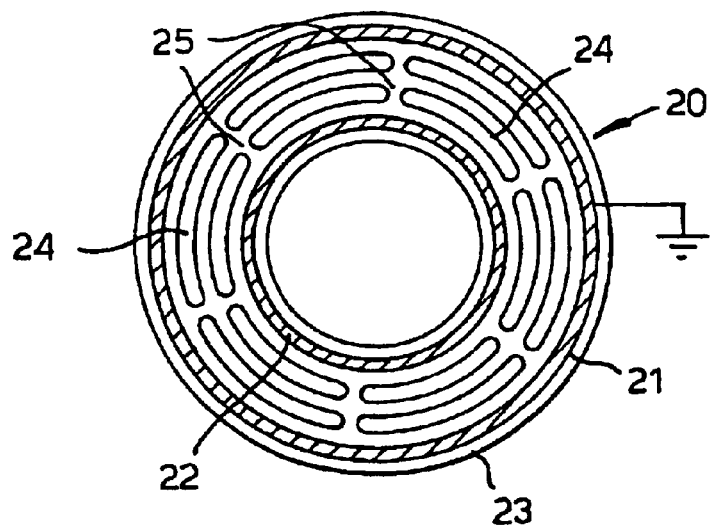
FIG. 2 is a transverse section of a second embodiment of the invention.

Although the invention has been described in terms of a planar geometry as shown in FIG. 1, it is equally applicable to a cylindrical geometry as shown in FIG. 2, although in this case, the radial thicknesses of the gas passages will have to vary in order that a uniform radial potential drop be achieved. The embodiments of reactor described in these examples may include catalytic components or be installed as part of an emissions control system employing catalysts or other emission control devices for the plasma assisted treatment of the exhaust gases from internal combustion engines. Such other emission control devices may comprise exhaust gas recirculation (EGR), variations in ignition timing, fuel injection timing and fuel injection pulse rate shaping. The reactor of these examples can be used in conjunction with a power supply and engine management system as described in patent specification WO00/50746. An article 'Stop go systems get the green light' in European Automotive Design, April 1998, pages 24–26 describes an example of an integrated starter alternator damper system (ISAD). Such an ISAD can be used as part of a power supply system to power a plasma assisted emissions control system of which a reactor as described herein is part. In addition, other power sources such as but not limited to fuel cells, gas turbines, solar cells and heat exchangers can be the primary or part-provider of the electrical-generating power source that can also be used to power the power supply system for the reactor.

Referring to FIG. 2 a cylindrical reactor body 20 consists of two cylindrical electrodes 21 and 22, which are embedded coaxially in a cylindrical body 23 of a temperature resistant dielectric material. Between the electrodes 21 and 22 are a series of concentric gas passages 24 of cylindrical form separated by radial supporting webs 25. The gas passages 24 are so arranged that they are superimposed radially and each group of gas passages 24 corresponds to the series of gas passages 6 of the FIG. 1 embodiment of the invention. (Only two rings of gas passages are shown in the drawing although it will be appreciated that the invention is not restricted to use of only two of such rings).

Unlike the FIG. 1 embodiment of the invention, the radial widths of the gas passages 24 are not the same, but are a function of the distance of the centres of the gas passages 24 from the inner electrode 22. This is because the radial distribution of the electric field between the electrodes 21 and 22 also is a function of the radial distance from the surface of the inner electrode 22. By a suitable choice of radial widths for the gas passages 24, these two effects can be made to cancel out, giving substantially equal radial electric fields in each of the gas passages 24.

In this case, the inner electrode 22 is arranged to be the high voltage electrode.

A particular use for such reactors is to reduce the emissions of one or more of nitrogeneous oxides, particulate including carbonaceous particulate, hydrocarbons including polyaromatic hydrocarbons, carbon monoxide and other regulated or unregulated combustion products from the exhausts of internal combustion engines. In this case, suitable dielectric materials for the body 5, are alpha and gamma aluminas, cordierite, mullite, alumino silicate ceramics, silicon carbide, micaceous moldable ceramics such as MICATHERM or mixtures of these. Suitable catalytic material that can be used for coating the surfaces of the gas channels 6, or for use as the dielectric filling material or for depositing onto the dielectric filling material, for example as a coating, are aluminas known under their Registered Trade Marks as LD 350, CT 530, Condea hollow extrudates, DYPAC, T-60 Alumina, T-162 alumina cordierite, $\alpha$, $\chi$ and $\gamma$ aluminas, and aluminas containing mixtures of these phases, ferroelectric materials such as titanates particularly barium titanate; titania, particularly in the anatase phase; zirconia, vanadia, silver aluminate, perovskites, spinels, metal-doped and metal oxide-doped or exchanged inorganic oxides such as cobalt oxide-doped alumina, vanadates and pyrovanadates and metal-doped zeolites. Examples of zeolites are those known as ZSM-5, Y, beta, mordenite all of which may contain iron, cobalt or copper with or without additional catalyst promoting cations such as cerium and lanthanum. Other examples of zeolites are alkali metal containing zeolites in particular sodium-Y zeolites that are particularly useful for treatment of nitrogeneous oxides. Examples of perovskites are $La_2CuO_4$, $La_{1.9}K_{0.1}Cu_{0.95}V_{0.05}O_4$ and $La_{0.9}K_{0.1}^-CoO_3$. Examples of vanadates are potassium metavanadate, caesium metavanadate, potassium pyrovanadate and caesium pyrovanadate. Mixtures of these compounds can also be used.

Gas permeable dielectric filling material for the reactor can be in the form of spheres, pellets, extrudates, fibres, sheets, wafers, frits, meshes, coils, foams, membrane, ceramic honeycomb monolith or granules or as a coating on a ceramic foam or ceramic honeycomb monolith. Combinations of one or more of the above can be used to create a filter structure with a non-uniform surface area and porosity, for example a graded porosity when presented to the exhaust gas and the filling material can also be placed outside of the plasma region of the reactor.

Zeolite materials are particularly useful for treatment of nitrogeneous oxides while perovskites and vanadates are particularly useful for treatment of carbonaceous particulates. Perovskites can also be particularly useful for combined removal of nitrogeneous oxides and particulate material.

Thus, exhaust gases containing hydrocarbon reductant residually-derived from the fuel combustion or added separately or containing a nitrogen-containing reductant for reduction of nitrogeneous oxides and or containing a carbon combustion catalyst as described earlier is passed through the plasma region of the plasma reactor containing dielectric material that is catalytically-active for gaseous processing reactions or is passed through such material before entering the plasma region or is passed through such material after passing through the plasma region. When a nitrogen-containing reductant is used the reductant can be added to exhaust leaving the plasma region of the reactor and before passage over catalytically-active dielectric material.

Also, suitable supply voltages are obtained from a power supply adapted to produce pulses having a potential of the order of kilovolts to tens of kilovolts and repetition frequencies in the range 50 to 5000 Hz, although higher frequencies of the order of tens of kilohertz can be used. Pulsed direct current is convenient for automotive use, but alternating potentials for example triangular or sine waves of the same or similar characteristics can be used.

What is claimed is:

1. A reactor for the plasma assisted processing of a gaseous medium, said reactor including a pair of electrodes having facing surfaces and spaced from each other for providing a separation therebetween, said separation of said facing surfaces being substantially uniform and defining a space between said pair of electrodes, a body of dielectric material positioned for providing a dielectric barrier between said pair of electrodes and configured for dividing said space between said pair of electrodes into a plurality of gas passages, said gas passages providing a plasma volume for said reactor, said gas passages having lengths along which gas flows during use of said reactor, said gas passages being aligned so that said lengths extend between and in a direction parallel with said facing surfaces of said pair of electrodes, said gas passages being spaced apart from one another in a direction perpendicular to the said facing surfaces, said gas passages including a pair of opposed sides having a contour which matches the contour of said facing surfaces of said pair of electrodes, said shape and spacing of said gas passages being configured to provide for a substantially uniform distribution of electric field across said plasma volume between said pair of electrodes, wherein said pair of electrodes are embedded in said body of dielectric material which extends across the space between said lair of electrodes, said plurality of gas passages extending longitudinally of said body of dielectric material to provide said plurality of electrically equivalent plasma volumes extending in series across said space between said pair of electrodes.

2. A reactor according to claim 1, wherein said dielectric material in selected from the group consisting of alpha or gamma aluminas, cordierite, mullite, alumina silicate ceramics, silicon carbide, micaceous glass or mixtures of these.

3. A reactor according to claim 1, wherein the gas passages have surfaces which present a catalytically active surface to gaseous medium passing through said gas passages.

4. A reactor according to claim 3, wherein the said surfaces of said gas passages are coated, impregnated or treated by ion-exchange or doping, with a catalytically-active material.

5. A reactor according to claim 4 wherein said catalytically-active material is selected from the group consisting of alpha and gamma aluminas and mixtures thereof, ferroelectric materials, titanates, titania, zirconia, vanadia, silver aluminate, perovskites, vanadates, zeolites, and mixtures of any of these materials.

6. A reactor according to claim 3 in combination with a internal combustion engine for treating exhaust therefrom, wherein said catalytically active surface is catalytically active towards the reduction of the emissions of one or more of nitrogenous oxides, particulate including carbonaceous particulate, hydrocarbons including polyaromatic hydrocarbons, carbon monoxide and other regulated or unregulated combustion products contained in said exhaust of said internal combustion engines.

7. A reactor according to claim 1, wherein said gas passages contain a gas permeable body of an insulating filling material.

8. A reactor according to claim 7, wherein said insulating filling material comprises a dielectric material.

9. A reactor according to claim 8, wherein said dielectric material is a catalytically active material.

10. A reactor according to claim 8, wherein said dielectric material is coated, impregnated or otherwise treated with a catalytically active material.

11. A reactor according to claim 8, wherein said dielectric material develops catalytically active properties by virtue of exposure to plasma in said gas passages.

12. A reactor according to claim 1, wherein said pair of electrodes are planar and said gas passages have a generally rectangular cross-section with major transverse dimensions parallel to those of said facing surfaces of said pair of electrodes.

13. A reactor according to claim 1, wherein said pair of electrodes are in the form of two concentric cylinders and said gas passages comprise a plurality of regularly spaced slots of cylindrical form.

14. A reactor according to claim 1 in combination with a power supply for applying a voltage to said reactor, wherein said gas passages are arranged such that a potential drop across said plasma volume between said pair of electrodes is equal to approximately half said voltage applied to said reactor.

15. A reactor according to claim 14, wherein said power supply for the reactor is provided by an integrated starter alternator damper system.

16. A reactor according to claim 1, wherein an electrical-generating power supply for said reactor is selected from the group consisting of fuel cells, gas turbines, solar cells and heat exchangers.

17. A reactor according to claim 1 incorporated as part of an emissions control system.

18. A reactor according to claim 17, wherein said emissions control system is used in conjunction with an engine management system.

19. A reactor according to claim 17, wherein said emissions control system includes an additional gas passage outside of said plasma region of the reactor in series with the aforesaid gas passages, said additional gas passage containing gas permeable catalytically active material.

* * * * *